United States Patent Office 3,169,903
Patented Feb. 16, 1965

3,169,903
ORGANOPHOSPHORUS INSECTICIDE
Donald W. Stoutamire, Modesto, Calif., assignor to Shell Oil Company, New York, N.Y., a corporation of Delaware
No Drawing. Filed June 26, 1961, Ser. No. 119,333
3 Claims. (Cl. 167—30)

This invention relates to a novel organophosphorus compound which has been found to be an excellent miticide suitable for the control of mites which prey upon living plants.

It has been found that toluene-alpha,alpha-dithiol bis-(O,O-dimethyl phosphorodithioate), which is represented by the formula:

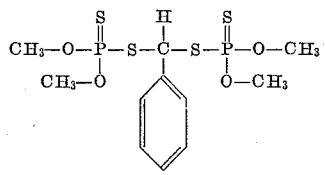

is highly toxic to mites and not significantly toxic to plants, so that this compound is an effective agent for control of mites on living plants. The compound not only has high initial miticidal activity, but is persistent, its activity being retained for many days after it has been applied to a plant.

Thus, it has been found that this new compound is about four and one-half times as effective as parathion (O,O-diethyl O-p-nitrophenyl thiophosphate) a commercial insecticide widely used as a miticide, and that it is much more persistent than parathion, against the typical mite, the two-spotted spider mite (*Tetranychus telarius*). The tests which established the superiority of the new compound were conducted as follows: solutions of the test compounds were made up employing either a neutral petroleum distillate boiling within the kerosene range, or acetone, as solvent. The solutions were sprayed on groups of plants infested with the two-spotted spider mite under controlled conditions which varied from one test to the other only with respect to the test material and its concentration. In each set of tests the conditions were directly comparable—i.e., the same test insect, same species of plant, environment, etc., were used, and the concentration of test material in each set of tests was the same. The toxicities of the test compounds were compared, in terms of the $LC_{50}$—that is, the concentration of each compound required to produce 50% mortality of the test insects. It was found under these conditions that toluene-alpha,alpha-dithiol bis(O,O-dimethyl phosphoro-dithioate) was almost exactly four and one-half times as toxic to the mites as was parathion.

Further, it was found that toluene-alpha,alpha-dithiol bis(O,O-dimethyl phosphorodithioate) is much more persistent than parathion. Thus, bean plants which had been infested a day earlier with two-spotted spider mites were sprayed with formulations already described at dosages high enough to kill all the adult mites immediately, then counts were made one week later to determine the effect of the residues on the progeny. At dosages of ten, twenty and forty times the $LC_{50}$, toluene-alpha,alpha-dithiol bis(O,O-dimethyl phosphorodithioate) effected 100% kill after seven days. At twenty times the $LC_{50}$, parathion effected but 85% kill, and even at forty times the $LC_{50}$, parathion effected but 95% kill, after seven days. It is thus apparent that the compound of this invention not only is much more toxic initially than parathion, but it maintains its high level of toxicity for a greater period of time.

Still further, the compound of this invention is much less toxic to mammals than is parathion, for it has been found that toluene-alpha,alpha-dithio bis(O,O-dimethyl phosphorodithioate) has an acute oral $LD_{50}$ (lethal dosage to kill 50%) to mice of 154 milligrams per kilogram of body weight, whereas parathion has an acute oral $LD_{50}$ to mice of but 18 milligrams per kilogram of body weight.

Toluene-alpha,alpha-dithiol bis(O,O-dimethyl phosphorodithioate) also has ben found to be toxic toward other insects, particularly to aphids, the corn earworm, and to mosquitoes.

Tests similar to those already described for examining the toxicity of a compound to the two-spotted spider mite also were conducted using the pea aphid, *Macrosiphum pisi*, as the test insect. The results are expressed as the concentration of the test material in the sprayed formulation required to cause approximately 50% mortality of the test insect—this concentration is denoted the $LC_{50}$ concentration, and is expressed in grams of the test compound per 100 milliliters of solvent. The results showed that the $LC_{50}$ concentration of toluene-alpha,alpha-dithio bis-(O,O-dimethyl phosphorodithioate) required was 0.00062 gram per 100 milliliters of the solvent.

The compound of the invention also was tested to determine its toxicity with respect to mosquito (*Anopheles albimanus*) larvae, as follows: sufficient of a 1% acetone solution of the test compound was dissolved in 100 milliliters of water to provide the desired concentration of the compound. Ten third-instar *A. albimanus* larvae were introduced into each of two replicates. The larvae were exposed to the solution of the test compound for twenty-four hours, then mortality counts were made. Various concentrations of the test compounds were used to determine the concentration required to kill approximately 50% of the larvae—i.e., the $LC_{50}$ concentration, expressed in micrograms of test compound per 100 milliliters of solution. It was found that the $LC_{50}$ concentration of toluene-alpha,alpha-dithiol bis(O,O-dimethyl phosphoro-dithioate) was 0.6 microgram per 100 milliliters of solution.

The activity of the compound of this invention with respect to the corn earworm, *Heliothis zea*, was determined by caging corn earworm larvae on a cut broad bean plant inserted in water after a formulation of the test compound prepared by dissolving an acetone solution of the compound in water had been sprayed thereon. Two replicates were used with each test, various tests being directed to different concentrations of the test compound in the liquid formulations. It was found that the $LC_{50}$ concentration of toluene-alpha,alpha-dithiol bis-(O,O-dimethyl phosphorodithioate) was 0.021 gram per 100 milliliters of the formulation.

It is thus evident that the compound of this invention is an effective insecticide, the term "insect" including not only the members of the class Insecta, but also related or similar non-vertebrate animal organisms belonging to the allied classes of arthropods and including mites, ticks, spiders, wood lice, and the like.

The compound of this invention can be employed for insecticidal purposes by the use of any of the methods which are conventionally employed in that art. For example, the compound can either be sprayed or otherwise applied in the form of a solution or dispersion, or it can be absorbed on an inert, finely-divided solid and applied as a dust. Useful solutions for application by spraying, brushing, dipping, and the like, can be prepared by using as the solvent any of the well-known inert horticultural carriers, including neutral hydrocarbons such as kerosene and other light mineral oil distillates of intermediate viscosity and volatility. Adjuvants, such as spreading or wetting agents, can also be included in the solutions, representative materials of this character being fatty acid soaps, rosin salts, saponins, gelatin, casein, long-chain fatty alcohols, alkyl and sulfonates, long chain alkyl sulfonates, phenol ethylene oxide condensates, ammonium salts, and the like. These solutions can be employed as such, or, more preferably, they can be dispersed or emulsified in water and the resulting aqueous dispersion or emulsion applied as a spray. Solid carrier materials which can be employed include talc, bentonite, lime gypsum, pyrophyllite and similar inert solid diluents. If desired, the compound of the present invention can be employed as an aerosol, as by dispersing the same into the atmosphere by means of a compressed gas.

The concentration of the compound to be used with the above carriers is dependent upon many factors, including the carrier employed, the method and conditions of application, and the insect species to be controlled, a proper consideration and resolution of these factors being within the skill of those versed in the insecticide art. In general, however, the compound of this invention is effective in concentrations of from about 0.01% to 0.5% based upon the total weight of the composition, though under some circumstances as little as about 0.00001% or as much as 2% or even more of the compound can be employed with good results from an insecticidal standpoint. Concentrates suitable for sale for dilution in the field may contain as much as 25–50% by weight, or even more, of the insecticide.

When employed as an insecticide, the compound of this invention can be employed either as the sole toxic ingredient of the insecticidal composition or can be employed in conjunction with other insecticidally-active materials. Representative insecticides of this latter class include the naturally-occurring insecticides such as pyrethrum, rotenone, sabadilla, and the like, as well as the various synthetic insecticides, including DDT, benzene hexachloride, thiodiphenylamine, cyanides, tetraethyl pyrophosphate, diethyl-p-nitrophenyl thiophosphate, dimethyl 2,2-dichlorovinyl phosphate, 1,2-dibromo-2,2-dichloroethyl dimethyl phosphate, azobenzene, and the various compounds of arsenic, lead and/or fluorine.

Toluene-alpha,alpha-dithio bis(O,O-dimethyl phosphorodithioate) is prepared by reacting benzaldehyde with O,O-dimethyl hydrogen phosphorodithioate and acetic anhydride in the presence of a small amount of a strong acid, such as sulfuric acid. In a particular instance, it was prepared as follows: 11 grams of benzaldehyde was added all at once with stirring to 15.7 grams of O,O-dimethyl hydrogen phosphorodithioate containing one drop of concentrated sulfuric acid. The mixture was heated to 30° C., and 11 grams of acetic anhydride containing one drop of concentrated sulfuric acid was added drop-wise, the temperature of the mixture being maintained at 30–35° C. The mixture then was stirred at room temperature for 30 minutes. Volatile materials were removed on a rotary evaporator at 35° C. and 0.1 millimeter mercury pressure. 29.3 grams of liquid remained; this was diluted with 4 milliliters of methanol and the mixture was allowed to stand 15 minutes, then dissolved in ether, washed with water and dried over sodium sulfate. The solvents were removed to leave 29 grams of liquid, which was molecularly distilled at 85° C. and 0.001 millimeter mercury pressure to give 21 grams of residue. Crystallization from cold ether, followed by recrystallization from hexane gave 14.2 grams (70% yield) of toluene-alpha,alpha-dithiol bis(O,O-dimethyl phosphorodithioate), M.P. 61–62°, identified by elemental analysis and infrared spectrum analysis.

*Elemental analysis.*—Calculated for $P_2S_4O_4C_{11}H_{12}$: P, 15.4; C, 32.7; H, 4.5. Found: P, 15.5; C, 32.3; H, 4.2.

Toluene-alpha,alpha-dithiol bis(O,O-dimethyl phosphorodithioate) also can be prepared by reacting a salt (e.g., potassium salt) of O,O-dimethyl hydrogen phosphorodithioate with benzal chloride.

I claim as my invention:

1. Toluene-alpha,alpha-dithio bis(O,O-dimethyl phosphorodithioate).

2. An insecticidal composition comprising toluene-alpha,alpha-dithio bis(O,O-dimethyl phosphorodithioate) and an insecticidal adjuvant therefor.

3. A method for killing insects which comprises bringing said insects into contact with an insecticidally effective amount of toluene-alpha,alpha-dithiol bis(O,O-dimethyl phosphorodithioate).

References Cited in the file of this patent

UNITED STATES PATENTS

| | | |
|---|---|---|
| 2,736,737 | Fishkill | Feb. 28, 1956 |
| 2,873,228 | Willard et al. | Feb. 10, 1959 |
| 2,882,198 | Willard et al. | Apr. 14, 1959 |